United States Patent Office 2,727,927
Patented Dec. 20, 1955

2,727,927

RECOVERY OF BETA-NAPHTHOL

Gerard N. Vriens, Somerville, and Eugene C. Medcalf, Bound Brook, N. J., assignors to American Cyanamid Company, New York, N. Y., a corporation of Maine No Drawing. Application June 2, 1954,
Serial No. 434,076

15 Claims. (Cl. 260—621)

This invention relates to an improved process of separating beta-naphthol from crude mixtures containing beta-dialkylmethylnaphthalenes such as beta-isopropylnaphthalene, beta-sec.-butylnaphthalene, et cetera.

There has been developed a process of preparing beta-naphthol by oxidizing beta-isopropylnaphthalene, for example, to beta-isopropylnaphthalene hydroperoxide and then cleaving the hydroperoxide by heating with acid to produce a mixture containing acetone and beta-naphthol. The oxidation process to the hydroperoxide is not carried to completion, a mixture being obtained beyond which further oxidation in the same stage is economically unattractive due to the formation of excessive quantities of by-products. As a result, the mixture obtained by the oxidation and acid cleavage steps contains, in addition to beta-naphthol and acetone, unreacted isopropylnaphthalene and certain by-products of the oxidation and cleavage reactions such as methyl naphthyl ketone, dimethylnaphthylcarbinol, and isopropenylnaphthalene.

Recovery of the acetone presents no problem. Its boiling point is sufficiently low so that it can be recovered readily by distillation. However, the separation of beta-naphthol from the unreacted hydrocarbon and by-products presents a serious problem. Fractional distillation is not practical because serious decomposition of the beta-naphthol occurs at the high temperatures required. Furthermore, due to the closeness of the boiling points of the various components, a pure beta-naphthol can be obtained only with great difficulty.

It has also been proposed to remove the beta-naphthol by extraction with aqueous caustic alkali followed by acidification. While this process can be used, the consumption of caustic alkali and acid is very high and the cost of beta-naphthol is seriously increased. This process does not meet the need for a practical and economical method of separating beta-naphthol from mixtures containing it associated with beta-isopropylnaphthalene.

In accordance with the present invention, we have found that the mixture resulting from the oxidation and cleavage of a beta-dialkylmethylnaphthalene as hereinbefore described, that is, a mixture of unreacted beta-dialkylmethylnaphthalene, beta-naphthol, and the by-products formed during the oxidation and cleavage reactions, namely, the alkyl naphthylketone, dialkylnaphthylcarbinol, and alkyl-alkylidenemethylnaphthalene, the dialkyl ketone having first been removed by distillation, can be subjected to the action of a two-phase solvent whereby substantially complete separation of the beta-naphthol from the other components of the mixture can be obtained. To accomplish the extraction operation, we employ a polar solvent to selectively extract the beta-naphthol and a saturated hydrocarbon solvent to extract the unreacted beta-dialkylmethylnaphthalene and by-products. Recovery of the beta-naphthol from the polar solvent layer is effected easily by separating the layers and distilling off the relatively low boiling polar solvent. In a similar manner the beta-dialkylmethylnaphthalene and by-products may be recovered from the saturated hydrocarbon solution. The recovered solvents, of course, may be recycled to the extraction stage.

It is a surprising feature of the present invention that the beta-naphthol can be separated so completely from the other components of the mixture by the use of a polar solvent. That is to say, it would be expected that the by-product ketones and alcohols formed during the oxidation and cleavage reactions would be selectively extracted by the polar solvent. It is most unexpected that the alkyl naphthyl ketones and dialkylnaphthylcarbinols would be selectively extracted by the saturated hydrocarbon with the result that a complete separation is obtained with the production of uncontaminated beta-naphthol of excellent purity.

The particular saturated hydrocarbon employed is not critical and any hydrocarbon or mixture may be used which has a boiling point sufficiently different from that of isopropylnaphthalene so that separation by distillation can readily be effected. The saturated hydrocarbon must also, of course, be immiscible with the polar solvent. Suitable saturated hydrocarbons are, for example, paraffin naphtha, heptane, cyclohexane, etc.

Representative examples of suitable polar solvents that may be employed are methanol, ethanol, ethylene glycol, aqueous methylamine, aqua ammonia, ethanolamine, $\beta,\beta'$-oxydipropionitrile, nitromethane, $\beta,\beta'$-iminodipropionitrile, dimethylformamide, acetonitrile, et cetera. In some cases the polar solvents are preferably used in the form of aqueous solutions wherein the concentration of polar solvent in water may vary from about 10% to about 100%. The polar solvent must, of course, be immiscible with the saturated hydrocarbon solvent.

The most economical embodiment of the present process involves continuous countercurrent flow of the two solvents. This permits very high output from equipment of moderate size and cost, and is preferred. However, the distribution between the two solvents is so sharp that excellent results can be obtained from a single stage separation which permits using simpler equipment and confers an additional flexibility to the process which is a practical operating advantage.

The invention will be illustrated in the following specific examples, parts being by weight unless otherwise specified.

*Example 1*

Into the center of a continuous countercurrent extraction column containing alternate mixing and separating sections with five extraction stages above, and five below, the feed stage, is introduced 144 parts by volume per hour of a mixture containing about 12% beta-naphthol, 83% unreacted isopropylnaphthalene and 1.3% and 1.6%, respectively, of the by-products methyl naphthyl ketone and dimethylnaphthylcarbinol formed during the oxidation of isopropylnaphthalene to the hydroperoxide and subsequent acid cleavage to beta-naphthol and acetone, the latter being removed by distillation. Into the bottom of the column is introduced 1000 parts by volume per hour of a paraffin naphtha having a boiling range more than 100° C. below the boiling point of isopropylnaphthalene, and into the top of the column is introduced 500 parts by volume of 75% methanol, which forms the dispersed phase. When steady state conditions are obtained, 814 parts of the methanol extract from the bottom of the column and 1687 parts of the naphtha extract from the top of the column are collected. By distilling off the solvent from each product, 35 parts of crude betanaphthol are obtained from the methanol solution and 278 parts of isopropylnaphthalene and by-products from the naphtha solution. The isopropylnaphthalene product is shown to be free from beta-naphthol by a caustic alkali extraction test. Upon acidification of the caustic extract, no beta-naphthol is precipitated.

The crude beta-naphthol melts at 111° C. and can be refined further by conventional means.

A sample of the feed mixture to the column is extracted with 5% caustic soda solution and the extract is acidified with hydrochloric acid. The precipitated beta-naphthol is filtered and dried. This crude beta-naphthol also melts at 111° C. thus showing that recovery by solvent extraction gives as pure a beta-naphthol as does recovery by caustic extraction.

Example 2

A run similar to Example 1 is carried out with more dilute methanol as one of the solvent phases. The conditions are the following: Feed rate—183 parts by volume per hour. Paraffin solvent rate—1500 parts by volume per hour. 50% methanol solvent rate—500 parts by volume per hour. The isopropylnaphthalene product recovered by evaporation of the paraffin solvent is found to be free of beta-naphthol as shown by an alkali extraction test and is found to have the following composition:

|  | Per cent |
|---|---|
| Isopropylnaphthalene | 94.8 |
| Isopropenylnaphthalene | 0.9 |
| Methyl naphthyl ketone | 1.5 |
| Dimethylnaphthylcarbinol | 1.8 |
| Tar | 1.0 |
|  | 100.0 |

The beta-naphthol recovered by evaporation of the polar solvent has a melting point of 115° C. A sample is dissolved in caustic and is found to contain only traces of caustic-insoluble material which shows that the caustic-insoluble by-products, methyl naphthyl ketone, dimethylnaphthylcarbinol, and isopropenylnaphthalene, formed during the oxidation of the isopropylnaphthalene to its hydroperoxide and acid cleavage to beta-naphthol, are selectively recovered from the feed mixture in the paraffin solvent phase.

Example 3

The procedure of Example 1 is followed except that a mixture of beta-naphthol, beta-sec-butylnaphthalene and small quantities of by-products formed by the oxidation of part of the butylnaphthalene to a hydroperoxide and subsequent cleavage to beta-naphthol is used in place of the feed of Example 1. Cyclohexane is used as the saturated hydrocarbon solvent. Crude beta-naphthol free from caustic-insoluble oxidation and cleavage by-products is obtained.

Example 4

The procedure of Example 2 is followed, replacing the paraffin naphtha with cyclohexane. The separation proceeds smoothly and a product is obtained having substantially the same purity as that of Example 2.

Example 5

The procedure of Example 1 is followed, replacing the paraffin naphtha with an equal amount of methylcyclohexane. The crude beta-naphthol obtained is of the same purity as obtained by the process of Example 1.

Example 6

15 parts of the feed mixture described in Example 1 is distributed in a series of single batches between 50 parts of each of the below-listed polar solvents and 50 parts of heptane. When the mixture has come to equilibrium, two layers form and are separated and analyzed. The results are shown in the following table:

SINGLE-STAGE EXTRACTIONS

| Polar Solvent | Percent of the beta-naphthol in the solvent phase | Percent of the isopropylnaphthalene in the heptane phase |
|---|---|---|
| 50% Methanol | 92 | 99 |
| 50% Ethyl alcohol | 91 | 96 |
| Ethylene glycol | 93 | 99 |
| β,β'-Oxydipropionitrile | 99 | 88 |
| Nitromethane | 96 | 84 |
| 30% Aqueous methylamine | 98 | 99 |
| Ethanolamine | 99.8 | 98 |

It will be noted that an excellent separation is obtainable in each case. Where there is an appreciable solubility of the isopropylnaphthalene in the polar solvent as in the case of the oxydipropionitrile and nitromethane it merely means that these solvents are more suitable for countercurrent extractions, whereas a solvent such as ethanolamine, when mixed with heptane, gives a separation so sharp that a single stage extraction is sufficient.

Example 7

5 parts of a mixture of by-products obtained during the oxidation of isopropylnaphthalene to a hydroperoxide and acid cleavage to beta-naphthol and acetone, the mixture containing 36% isopropenylnaphthalene and 57% methyl naphthyl ketone, is distributed between 50 parts of each of a series of polar solvents for beta-naphthol and 50 parts of heptane. When the mixture has come to equilibrium, two layers form and are analyzed with the following results.

SINGLE-STAGE EXTRACTIONS

| Polar Solvent | Percent of by-products in solvent phase | Percent of by-products in heptane phase |
|---|---|---|
| 50% Methanol | 7.8 | 92.2 |
| 30% Methylamine | 4.1 | 95.9 |

These data confirm that by the use of counter-current fractional extraction, substantially all of the by-products can be removed from the beta-naphthol by the paraffin solvent phase.

Example 8

188 parts by volume of a mixture containing about 12% beta-naphthol, 83% unreacted isopropylnaphthalene, and 5% of by-products formed during the oxidation of isopropylnaphthalene to a hydroperoxide and subsequent acid cleavage to beta-naphthol and acetone, the latter being removed by distillation, is distributed between 550 parts by volume of 50% methanol and 1100 parts by volume of heptane in a two-stage countercurrent extraction system. After evaporation of the solvent from the methanol extract, 20.4 parts of dry crude beta-naphthol are obtained, having a melting point of 119.9° C.

The foregoing example illustrates that an extremely high purity beta-naphthol can be obtained by solvent extraction.

This application is a continuation-in-part of our application Serial No. 266,601, filed January 15, 1952, now abandoned.

We claim:
1. In a process of recovering beta-naphthol from a mixture containing a beta-dialkylmethylnaphthalene and small amounts of the by-product alkyl naphthyl ketone and dialkylnaphthylcarbinol formed during the oxidation of the beta-dialkylmethylnaphthalene to a hydroperoxide and acid cleavage to beta-naphthol and a dialkyl ketone, the dialkyl ketone being removed by dis- tillation; the steps which comprise subjecting the mixture simultaneously to the action of two immiscible solvents, one of which is a polar solvent for the beta-naphthol and the other of which is a saturated hydrocarbon solvent for the beta-dialkylmethylnaphthalene and by-products, until substantial equilibrium is reached, separating the resulting liquid phases, and recovering the beta-naphthol from the polar solvent, the polar solvent being selected from the group consisting of methanol, ethanol, ethylene glycol, aqueous methylamine, aqua ammonia, ethanol amine, $\beta,\beta'$-oxydipropionitrile, nitromethane, $\beta,\beta'$-iminodipropionitrile, dimethylformamide, and acetonitrile.

2. A process according to claim 1 in which the separation is effected by introducing the mixture of beta-naphthol, beta-dialkylmethylnaphthalene, and by-products into a countercurrent flow of the two solvents, and recovering the beta-naphthol from the effluent polar solvent phase, and recovering the non-phenolic constituents from the effluent saturated hydrocarbon phase.

3. In a process of recovering beta-naphthol from a mixture containing beta-isopropylnaphthalene and small amounts of the by-products methyl naphthyl ketone and dimethylnaphthylcarbinol formed during the oxidation of the beta-isopropylnaphthalene to a hydroperoxide and acid cleavage to beta-naphthol and acetone, the acetone being removed by distillation; the steps which comprise subjecting the mixture simultaneously to the action of two immiscible solvents, one of which is a polar solvent for the beta-naphthol and the other of which is a saturated hydrocarbon solvent for the beta-isopropylnaphthalene and by-products, until substantial equilibrium is reached, separating the resulting liquid phases, and recovering the beta-naphthol from the polar solvent, the polar solvent being selected from the group consisting of methanol, ethanol, ethylene glycol, aqueous methylamine, aqua ammonia, ethanol amine, $\beta,\beta'$-oxydipropionitrile, nitromethane, $\beta,\beta'$-iminodipropionitrile, dimethylformamide, and acetonitrile.

4. A process according to claim 3 in which the polar solvent is aqueous methanol.

5. A process according to claim 3 in which the separation is effected by introducing the mixture of beta-naphthol, beta-isopropylnaphthalene, and by-products into a countercurrent flow of the two solvents, and recovering the beta-naphthol from the effluent polar solvent phase, and recovering the non-phenolic constituents from the effluent saturated hydrocarbon phase.

6. A process according to claim 5 in which the polar solvent is aqueous methanol.

7. A process according to claim 3 in which the polar solvent is aqueous ethanol.

8. A process according to claim 1 in which the polar solvent is ethylene glycol.

9. A process according to claim 3 in which the polar solvent is ethylene glycol.

10. A process according to claim 1 in which the polar solvent is aqueous methylamine.

11. A process according to claim 3 in which the polar solvent is aqueous methylamine.

12. A process according to claim 1 in which the polar solvent is ethanolamine.

13. A process according to claim 3 in which the polar solvent is ethanolamine.

14. A process according to claim 1 in which the polar solvent is aqueous methanol.

15. A process according to claim 2 in which the polar solvent is aqueous methanol.

References Cited in the file of this patent

UNITED STATES PATENTS

| 1,955,023 | Roos et al. | Apr. 17, 1934 |
| 2,245,945 | Van Dijck et al. | June 17, 1941 |

FOREIGN PATENTS

| 654,035 | Great Britain | May 30, 1951 |
| 489,028 | Canada | Dec. 23, 1952 |

OTHER REFERENCES

Beilstein: Handbuch der Org. Chem. (4th ed., 1923), vol. 6, page 627 (1 pg.).